United States Patent [19]

Strader

[11] 3,920,283
[45] Nov. 18, 1975

[54] BRAKE RESPONSIVE LOAD TRANSFER APPARATUS AND METHOD

[75] Inventor: Don S. Strader, Muskegon, Mich.

[73] Assignee: Lear Siegler, Inc., Santa Monica, Calif.

[22] Filed: Aug. 26, 1974

[21] Appl. No.: 500,636

[52] U.S. Cl............... 303/21 A; 280/6 R; 303/22 A
[51] Int. Cl.² ........................................... B60T 8/22
[58] Field of Search......... 188/195; 280/6 R, 124 R, 280/124 F; 303/21 R, 21 A, 22 R, 22 A

[56] References Cited
UNITED STATES PATENTS

| | | | |
|---|---|---|---|
| 3,165,363 | 1/1965 | Behles | 303/22 A X |
| 3,537,715 | 11/1970 | Gualdoni | 280/6 R |

*Primary Examiner*—Duane A. Reger
*Attorney, Agent, or Firm*—McGarry & Waters

[57] ABSTRACT

Load transfer apparatus for resisting the effects of brake torque on a tandem axle suspension system in a vehicle comprises air pressure apparatus adapted to inject a predetermined air pressure into an air spring over the rearmost axle whenever actuated and to relieve the pressure in the air spring whenever deactuated; and a control device adapted to sense the braking force applied to the wheels and actuate the air pressure apparatus when the braking force reaches a predetermined level. The control device also deactuates this air pressure apparatus when the braking force or speed of the vehicle drops to a predetermined level. Braking force can be measured as a function of the rate of wheel deceleration, and an anti-wheel lock control device can be employed for this purpose. Alternatively, braking force can be measured as a function of brake pressure.

32 Claims, 7 Drawing Figures

BRAKE RESPONSIVE LOAD TRANSFER APPARATUS AND METHOD

BACKGROUND OF THE INVENTION

1. Field of the Invention

This invention relates generally to vehicle suspension systems and more particularly to an apparatus and method for counteracting the effects of brake torque on the tandem axle suspension system in a vehicle.

2. Description of the Prior Art

Larger vehicles, such as heavy duty trucks or the like, frequently employ double or tandem axles instead of a single axle for supporting heavy loads. Any number of suspension systems may be employed in tandem axle systems, with typical suspension systems being an all air spring system, an all leaf or other mechanical spring system, or a combination of leaf spring and air spring systems. The axles may be mounted independently of each other under the vehicle, such that movement of one axle relative to the frame about its mounting apparatus does not affect the position or movement of the other axle. Alternatively, the axles may be mounted interdependently from a common pivot point on each side of the vehicle, such that the movement of one axle does affect the movement of the other axle or at least exerts a resilient force on the other axle.

One example of the latter case is a tandem axle wherein each axle is mounted on one end of a leaf spring, and the leaf spring is mounted at the center thereof on a trunion suspended below the vehicle frame. With such a vehicle suspension system, when one of the two axles exerts a rotational force about the common pivot point, this force is transmitted through the leaf spring to the other axle. Thus, when the front axle is urged upwardly by a bump or the like, the rear axle is resiliently urged in a downward direction.

One of the problems encountered with tandem axle vehicles wherein the axles are interdependently mounted about a common pivot point between the axles (particularly when the axles are mounted on the ends of leaf springs), is that under severe braking conditions, the torque exerted by the brakes on the wheels urges the two axles to rotate forwardly about the common pivot point, with the front axle being urged in a downward direction and the rear axle being urged in an upward direction. The movement of the front axle is restrained by the ground, but the rear wheels experience a phenomenon known as "hopping" and bounce up and down on the ground as the vehicle is slowed. This reduces the effective gripping surface of the wheels on the pavement and reduces brake efficiency. Further, the action of wheel hopping creates vibrational stresses in the vehicle that are both damaging to the suspension and to the load that may be carried in the vehicle. It is, therefore, desirable to employ some type of apparatus in the vehicle that counteracts the effects of brake torque and reduces wheel hopping.

Heretofore, attempts have been made to counteract brake torque by employing mechanical linkages that are adapted to prevent axle rotation with respect to the common pivot point. Such mechanical linkages are designed to maintain both axles at the same level with respect to the vehicle. The big problem with mechanical linkages of this nature is that they have been ineffective in counteracting the effects of brake torque and preventing wheel hopping.

SUMMARY OF THE INVENTION

The present invention comprises a load transfer apparatus and method for simply and effectively counteracting the effect of brake torque, wherein air springs mounted over the rearmost axle in a tandem axle system are automatically inflated whenever the braking force applied to the wheels reaches a predetermined level.

The present invention can be applied to an apparatus already present on an existing vehicle or can be incorporated into a completely new suspension system. In a vehicle wherein air springs are already provided over the rearmost tandem axle and an anti-wheel lock control device is already employed for the purpose of controlling brake pressure, the apparatus of the present invention comprises air pressure apparatus triggered by the anti-wheel lock control device and adapted to inflate the air springs to a predetermined pressure whenever the anti-wheel lock control device becomes actuated.

In such a case, the load transfer apparatus comprises a pressurized air reservoir connected to the air springs through a valve mechanism adapted to permit air to pass from the pressure reservoir to the air springs whenever the anti-wheel lock control device is actuated. The valve mechanism may be a solenoid-operated two position valve that permits air to pass from the pressure reservoir into the air springs when the valve is in a first or open position and blocks the passage of air from the air reservoir to the air springs and releases the pressure from the air springs when the valve is in a second or closed position.

The apparatus of the present invention is of particular benefit when employed in connection with a vehicle wherein the tandem axles are independently suspended from a common pivot point — i.e., where the rotation of one axle with regard to the pivot point effects an opposing force on the other axle. When two axles are thus suspended (in particular, when the axles are suspended in opposite ends of a leaf spring that is mounted by means of a trunion at the midpoint of the leaf spring to the under side of the vehicle), brake torque exerts a strong torsional force on the springs, and the load transfer apparatus of the present invention effectively counteracts this force.

In accordance with the present invention, it has been determined that the pressure of 50–80 psi in the air springs is usually sufficient for most loads, with the specific pressure range employed being dependent upon several factors, including the weight of the load carried by the vehicle. For most average loads, a pressure range of 60–65 psi is satisfactory.

Another aspect of the present invention is that a separate control device may be employed for the load transfer system instead of the controls for the anti-wheel lock control device. In such a case, the input signal to the control device is received from the same sensors on the wheels as employed in connection with the anti-wheel lock control device, but the control device that receives this input signal and emits a control signal when the wheel deceleration rate reaches a predetermined level is separate from the corresponding unit employed for the anti-wheel lock control device. When a separate control device is employed for the load transfer system, separate settings can be established for the actuation and release of the load transfer system and the brake system, with the actuation settings for the load transfer system preferably being somewhat lower than the actuation settings for the anti-wheel lock control device.

Still another aspect of the present invention is that the actuation of the load transfer system may be achieved independently of any anti-wheel lock control device by making the actuation of the valve mechanism that pressurizes the air springs dependent upon the air pressure being applied to the brakes as opposed to the actual speed of rotation of the wheels. In such a system a pilot valve or pressure-operated relay valve is employed between the pressurized air reservoir and the air springs, and this valve is adjusted so that it is actuated whenever the pressure in the brake system reaches a predetermined level. Typically, maximum braking conditions realize a brake pressure in the area of 100 psi in the brake line, and it may be desirable to actuate the load transfer system at a brake pressure of about 60 psi.

These and other features and advantages of the present invention will hereinafter appear, and for purposes of illustration, but not of limitation, a preferred embodiment of the present invention is described in detail below.

DETAILED DESCRIPTION OF PREFERRED EMBODIMENTS

Figure 1:
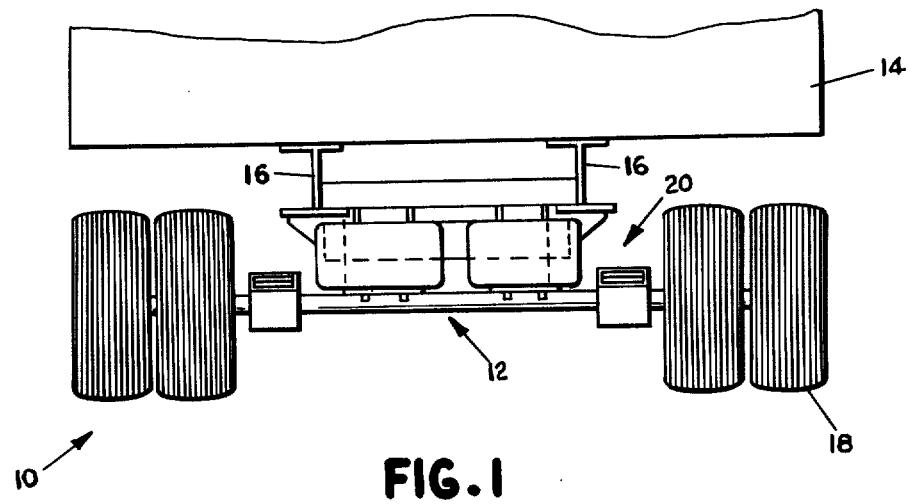
FIG. 1 is a broken end view of a vehicle employing the load transfer apparatus of the present invention.
Figure 2:
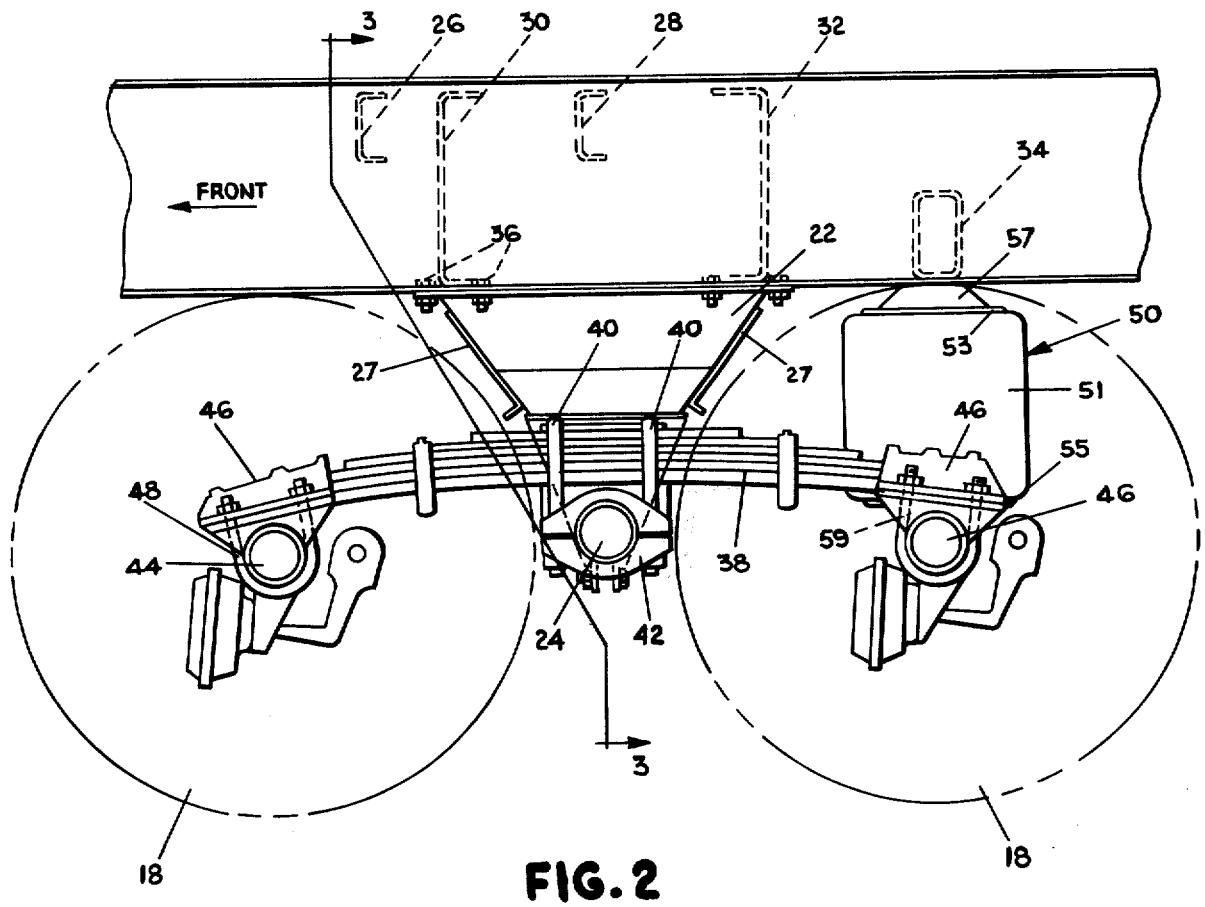
FIG. 2 is a broken side view showing the tandem axle suspension system of the vehicle shown in FIG. 1.
Figure 3:
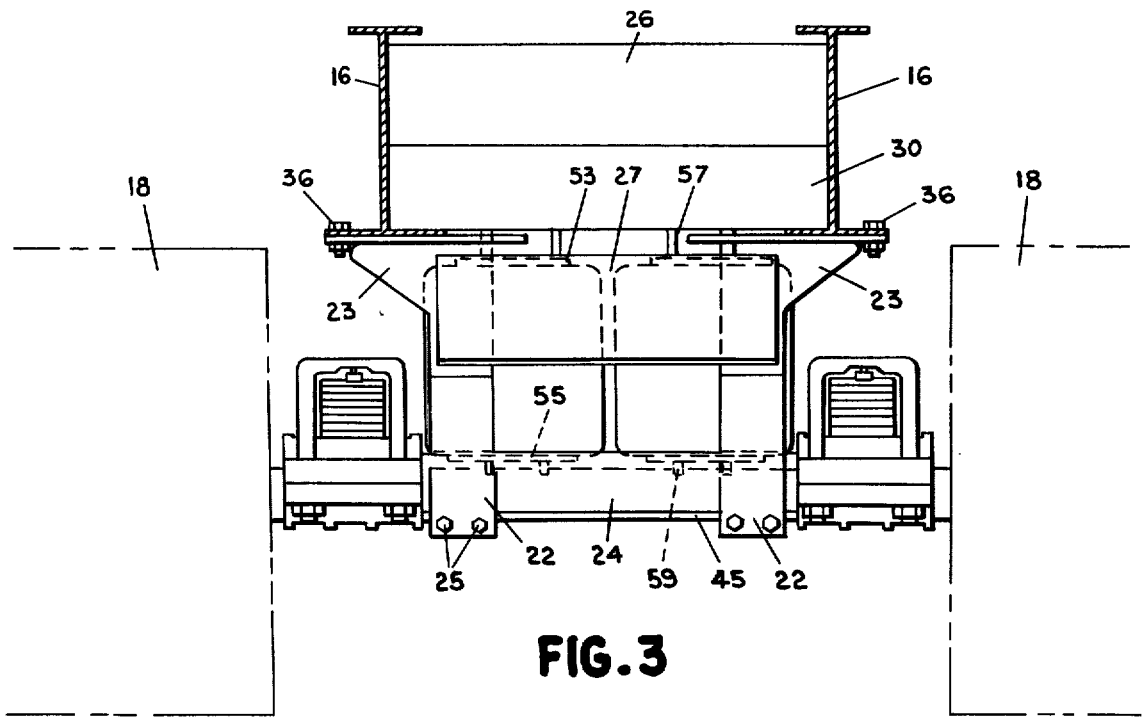
FIG. 3 is a view taken along line 3—3 of FIG. 2.
Figure 4:
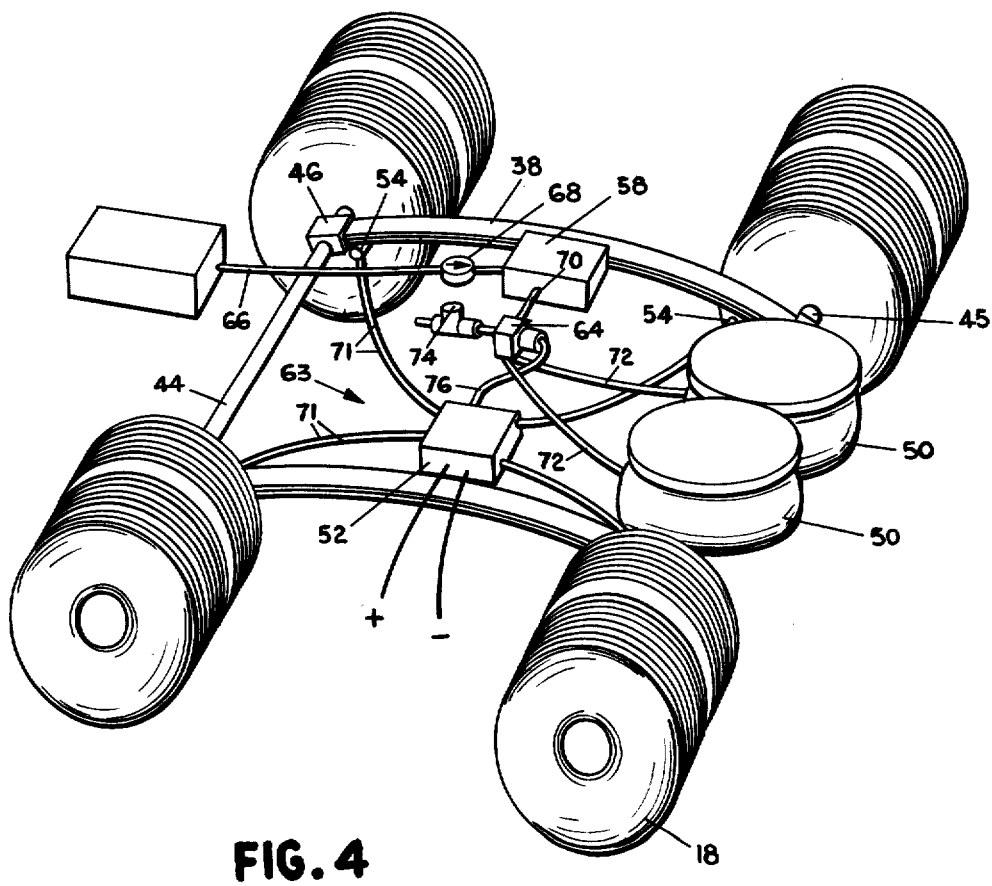
FIG. 4 is a schematic view of a tandem axle suspension system employing the load transfer apparatus of the present invention.

Referring now to the drawings, a vehicle 10 employing load transfer apparatus 12 in accordance with the present invention is shown in FIGS. 1-3, and the actual components of load transfer appartus 12 are shown in FIGS. 4 and 5a-c. In FIGS. 2 and 4, the front of the vehicle is to the left.

Vehicle 10 comprises a body 14 mounted on I-beam frame rails 16, which run longitudinally under the body. Suspension system 20 is attached to frame rails 16 by means of a trunion 24, which is mounted laterally across the frame on a pair of trunion brackets 22. The top of trunion brackets 22 are welded to frame brackets 23, and frame brackets 23 are bolted to I-beams 16 by bolts 36. Trunion 24 is bolted in aligned openings in the bottom of the trunion clamp by means of bolts 25. Brace plates 27 extend between frame brackets 23 and provide additional reinforcement for the trunion brackets. Smaller cross braces 26 and 28 formed in the shape of channel members extend across rail members 16, and larger frame cross members 30 and 32 also extend across rail members 16 and reinforce the supporting structure in the vehicle. Still another cross member, an air spring cross member formed in the shape of a rectangular tube 34 also extends between the rail members 16.

Vehicle 10 is mounted on wheels 18 by means of a tandem axle suspension system 20. Suspension system 20 comprises a pair of leaf springs 38 mounted longitudinally with respect to frame rails 16 on trunion 24. Leaf springs 38 are mounted to the trunion by means of U-bolts 40 that fit over the top of leaf springs 38 and engage a trunion bracket 42 on the underside of the leaf springs. Front and rear axles 44 and 45, respectively, are mounted on opposite ends of leaf springs 38 and extend transversely across the width of the vehicle. Two wheels are mounted on each end of each axle, thus providing eight wheels to support the load of the vehicle. Each axle is mounted on the ends of the leaf springs by means of spring mounting brackets 46 on the end of each spring, with the axles being retained on the mounting brackets by means of U-bolts 48.

In addition to leaf springs 38, a pair of auxiliary air springs 50 are mounted over the rear axle and extend from the rear axle upwardly into contact with cross member 34. Air springs 50 are of conventional design and are mounted on the vehicle in a conventional manner. Air springs 50 comprise an inflatable air bag 51 with top and bottom plates 53 and 55, respectively, being provided for attaching the air springs to the vehicle. Brackets 57 and 59 on the top and bottom plates are mounted, respectively, on cross member 34 and rear axle 45.

In the leaf spring suspension shown herein, air springs 50 are not full duty springs but are auxiliary springs that are used for special purposes. The main suspension of the vehicle is provided by leaf springs 38, and under ordinary circumstances air springs 50 are inflated to only about 3-5 psi air pressure in order to maintain the air springs in a generally inflated condition.

Aside from the purposes of the present invention, auxiliary air springs 50 are employed in vehicles for the following purpose. When a vehicle is unloaded and is being returned to its destination for reloading, it is inefficient and undesirable to maintain all eight wheels of the tandem axle of the vehicle in contact with the ground. Accordingly, auxiliary air springs are provided over the rear axle, and these air springs are inflated after the truck has been unloaded. The inflation of air springs 50 creates a downward force on the rear axle, and this results in a clockwise rotational force exerted on the leaf spring (FIG. 2 orientation). This clockwise rotational force causes an upward force to be exerted against the front axle. As the air spring is fully inflated, the rotational movement proceeds to the point where only the rear wheels are in contact with the ground and the front wheels have been lifted from the ground. Thus, when the truck is returned to its origin for reloading, only four of the wheels are in contact with the ground. This saves wear on four of the wheels as well as provides a superior ride for the vehicle.

The foregoing structural detail of the suspension system of vehicle 10 are conventional. It is not critical that the suspension system shown herein be employed with the apparatus of the present invention, but this suspension system is shown merely for exemplary purposes. One feature of this suspension system that is important in the context of the present invention is that the front and rear axles are interdependently suspended from the frame at a common pivot point so that a torsional force exerted on one axle will result in an opposite force on the other axle. With this type of suspension system, when the brakes are applied hard, the whole leaf spring 38 tends to move in a counterclockwise direction (i.e., the direction of the wheels), according to FIG. 2 orientation. This tends to press the front wheels down against the ground and to lift the rear wheels off the ground. This lifting action causes the rear wheel to hop and seriously impairs the braking efficiency of the vehicle.

As shown in FIG. 4, vehicle 10 also comprises a conventional anti-wheel lock device 63 for controlling brake pressure and preventing skidding. Devices of this nature are conventionally available on the market and include the following elements. Sensors 54 are mounted on the wheels and generate electrical D.C. pulses in proportion to the rate of rotation of the wheels. These D.C. pulses are transmitted to a control device 52 (which is a miniature computerized apparatus) by leads 71. Control device 52 computes the rate of deceleration of the vehicle from the information provided by the sensing unit. The control device is programmed to generate a control signal whenever the deceleration of the apparatus reaches a predetermined point, with this point usually being adjustable. Typically, the brake control device becomes actuated by a deceleration rate of about 14–19 feet per second per second, with maximum brake control being achieved at about 19 feet per second per second deceleration. The signal from the control device is transmitted by leads 73 to brake response control apparatus 61, (shown schematically in FIG. 5) that relieves brake pressure and prevents wheel locking whenever the rate of wheel deceleration reaches the predetermined point. Typically, the control device will automatically deactuate when the speed of the wheel reaches a relatively low level, such as 10 miles an hour, at which point the control device will cut out and let the vehicle skid.

Another element included in vehicle 10 is an air compressor 56 of conventional design. Usually such air compressors are capable of providing air pressure up to a maximum of about 110–115 psi, with the normal function of the air compressor being to provide compressed air for the air brakes of the vehicle.

In accordance with the present invention, load transfer apparatus 12 comprises a pressurized air reservoir 58 having an inlet 60 connected to the air compressor and an outlet 62 leading to the air springs through a control valve 64. An inlet conduit 66 connects the air compressor with the air reservoir, and a check valve 68 in conduit 66 prevents air from flowing in a reverse direction from the air reservoir back to the compressor.

Pressurized air reservoir 58 is of conventional design and is adapted to withstand the full 110–115 psi air pressure output of a conventional compressor. The volume of the air reservoir is about equal to the volume of the air springs, so that the air pressure in the air springs and the air reservoir equalizes at about half of the fully charged pressure of the air reservoir when the air reservoir is connected to the air springs. The volume of the air reservoir and the pressure applied to the reservoir may be adjusted to provide variation in the pressure applied to the air springs.

A conduit 70 is connected to outlet 67 of the air reservoir and leads to the inlet of control valve 64. One outlet of control valve 64 leads to air springs 50 by means of conduits 72 to the air springs. Another outlet of the valve is vented to the atmosphere through a pressure relief valve 74.

Control valve 64 is a conventional two-position solenoid operated valve. In its first or open position, the line between the air reservoir and the air springs is open and the outlet to the relief valve is closed, thus allowing air to flow from the pressurized air reservoir to inflate the air springs. In its second or closed position, the line between the air reservoir and the air springs is blocked and the air springs are vented to the atmosphere through relief valve 74. With valve 64 in its closed position, the air springs become deflated, retaining only a minor residual pressure of 3–5 psi in order to maintain the shape of the air springs.

Solenoid valve 64 is operably connected to anti-wheel lock control device 63 through electrical leads 76. The solenoid is normally biased toward its second or closed position, and the control device is adapted to emit an electrical control signal that actuates the solenoid and moves the valve to its first or open position whenever the brake deceleration rate reaches a predetermined level. When the control signal is removed — i.e., when vehicle speed drops to a certain level — the valve automatically returns to its closed position, wherein pressure in the air springs is relieved.

The load transfer apparatus of the present invention operates in the following manner. When the anti-wheel lock device first generates a brake control signal, this brake control signal actuates solenoid valve 64. The actuation of solenoid valve 64 causes it to move to its open position, wherein conduit 70 leading from the pressurized air reservoir is connected to conduits 72 leading to the air springs, thus allowing the air reservoir to pressurize the air springs. The resulting pressure in the air springs should be about 50–80 psi, depending on the vehicle and the load being carried. A pressure of 60–65 psi is satisfactory for most loads. With the air springs inflated in this manner, a downward force is exerted on the rear axle in order to counteract the upward force on the rear axle resulting from the torque exerted by the brakes. This downward force eliminates wheel hopping and improves the braking efficiency of the vehicle.

When the vehicle speed reduces to a sufficiently low level (e.g., about 10 miles per hour) the anti-wheel lock control device becomes deactuated. This deactuates the solenoid valve and moves it to its closed position. In this position, the passage from air reservoir 58 to air springs 50 is blocked, and conduits 72 leading from the air springs are vented through relief valve 74, thus releasing most of the air pressure in the air springs. By maintaining slight air pressure in the air springs, the life of the air springs is prolonged.

Figure 5A:
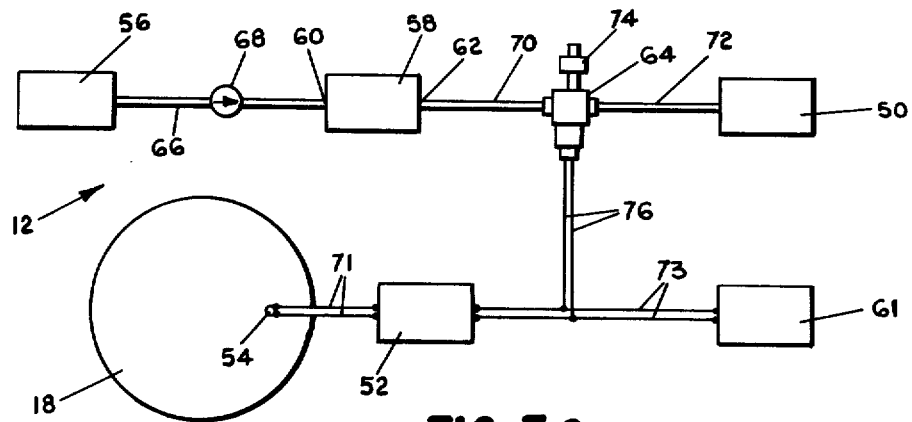
FIGS. 5a, 5b, and 5c are schematic views of the load transfer apparatus of the present invention, showing three different types of control devices that may be employed in this apparatus.
Figure 5B:
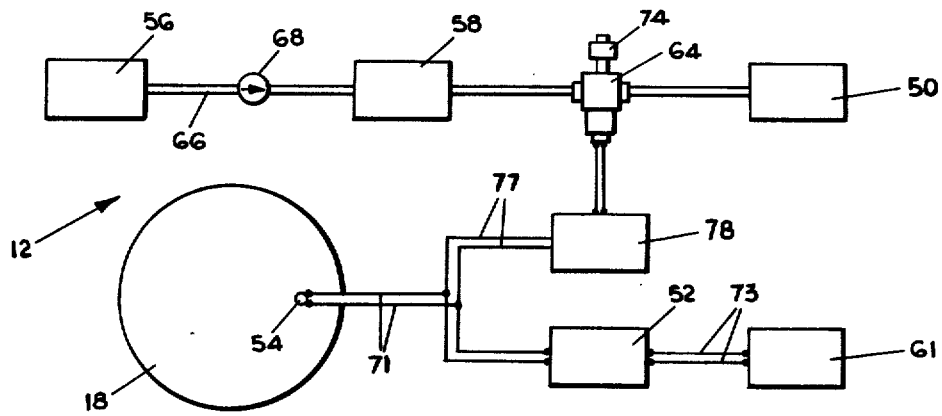
Figure 5C:
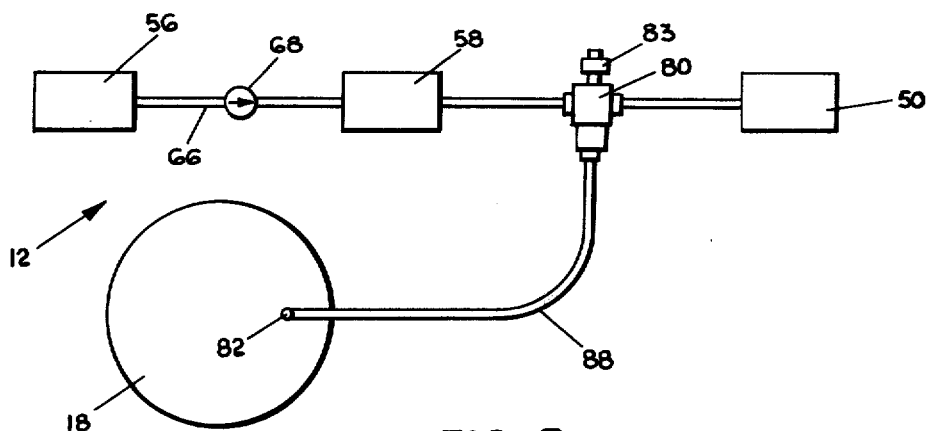

Other combinations of elements for effecting the inflation of the air springs upon the application of a predetermined braking force to the wheels are shown schematically in FIGS. 5a–c. The apparatus described above is shown in FIG. 5(a), wherein the normal brake control output of the anti-wheel lock device is employed to provide the actuation signal for solenoid valve 64.

In the embodiment shown in FIG. 5b, a separate control device 78 is employed to control the load transfer apparatus in addition to control device 52 for controlling brake response. Control device 78 is identical to control device 52 and is connected by leads 77 into leads 71 leading from the same sensor 54 that supplies the brake control signal. Thus the same input signal is received in both the control device controlling the load transfer system and the control device controlling the brake pressure. When a separate control device is employed, the trigger level at which the load transfer system is actuated is separately adjustable from the trigger level of the anti-wheel lock device. With this option available, it is generally desirable to actuate the load transfer system at a slightly lower level of deceleration than the anti-wheel lock device. Typically, the brake transfer system will be actuated at a deceleration rate of about 14 feet per second per second, while the anti-wheel lock device will be actuated at a deceleration rate of about 19 feet per second per second.

Still another embodiment of the load transfer apparatus of the present invention is shown schematically in FIG. 5c. In that embodiment, the anti-wheel lock device is eliminated completely and a simple pressure operated relay valve 80 is substituted for the solenoid valve and the anti-wheel lock control device. A separate sensor 82 measures brake force by measuring the brake pressure applied to the brakes (instead of the rate of deceleration of the wheel), and this brake pressure is transmitted directly to the pressure operated valve by conduit 88. Pressure operated valve 80 is adjusted so that the conduit leading from the pressurized air reservoir to the air springs is open whenever the brake pressure reaches a predetermined level. Conversely, whenever the brake pressure drops to a certain level, the valve becomes closed and the air pressure in the air springs is released through a pressure relief valve 83 similar to relief valve 74. The control signal in this type of apparatus is not as closely correlated with brake torque as the control signal effected by the use of an anti-wheel lock device (or similar electronic equipment that measures wheel deceleration), but this apparatus does have the advantage of simplicity and inexpensiveness.

It should be understood that various changes and modifications may be made and the arrangements and details of construction of the embodiments disclosed herein without departing from the spirit of the present invention.

The embodiments of the invention in which an exclusive property or privilege is claimed are defined as follows:

1. Load transfer means for use in a vehicle comprising a tandem axle suspension system; at least one air spring mounted over the rearmost of the tandem axles; and anti-wheel lock control means for controlling brake pressûre in response to the rate of deceleration of the vehicle wheels, said load transfer means being operably connected to the anti-wheel lock control means and the air spring and being adapted to inflate the air spring to an increased pressure to resist the effects of brake torque on the tandem axles whenever the anti-wheel lock control means becomes actuated.

2. Load transfer means as claimed in claim 1 and being further adapted to relieve the increased pressure from the air spring whenever the anti-wheel lock control means becomes deactuated.

3. Lock transfer apparatus as claimed in claim 2 wherein the tandem axles are interdependently suspended from a common pivot point between the axles on each side of the vehicle.

4. Load transfer means as claimed in claim 3 wherein the load transfer means comprises:
air reservoir means adapted to hold air under pressure;
conduit means adapted to convey pressurized air from the air reservoir means to the air spring; and
valve means in said conduit means, said valve means being adapted to normally block said conduit but being actuatable by said anti-wheel lock control means to open said conduit and permit air pressure to be applied to the air spring from the air reservoir means whenever the anti-wheel lock control means is actuated.

5. Load transfer means as claimed in claim 4 wherein the valve means is further adapted to release pressure from the air spring and block the flow of air from the air reservoir means to the air spring whenever the anti-wheel lock control means is deactuated.

6. Load transfer means as claimed in claim 5 wherein the anti-wheel lock control means becomes actuated when the rate of wheel deceleration reaches about 14–19 feet per second per second.

7. Load transfer means as claimed in claim 6 wherein
the load transfer means inflates the air spring to about 50–80 psi when the anti-wheel lock control device becomes actuated; and
the load tansfer device relieves substantially all of the pressure in the air spring when the anti-wheel control device becomes actuated.

8. Load transfer means as claimed in claim 7 wherein:
the tandem axles are suspended from opposite ends of leaf springs mounted longitudinally on each side of the vehicle, said leaf springs being pivotably mounted on a transverse trunion at mid-points of the leaf springs; and
the air springs are auxiliary air springs and are maintained in a substantially deflated condition until inflated by the load transfer means.

9. Load transfer means as claimed in claim 8 wherein the valve means comprises a two-position solenoid operated valve, and the air reservoir means is pressurized by a compressor in the vehicle.

10. Load transfer means for use in a vehicle suspension system comprising tandem axles interdependently suspended from a common pivot point on each side of the vehicle; and at least one air spring mounted over the rearmost axle, said load transfer means being adapted to counteract the effects of brake torque on the tandem axles and including:
air pressure means adapted to inflate the air spring to an increased pressure to resist the effects of brake torque on the tandem axles when actuated and to relieve the increased pressure from the air spring when deactuated; and
control means adapted to measure the rate of wheel deceleration and actuate the air pressure means when the rate of wheel deceleration increases to a predetermined level, said control means being adapted to deactuate the air pressure means when the rate of wheel rotation or deceleration drops to a second predetermined level.

11. Load transfer means as claimed in claim 10 wherein the air pressure means comprises:
air reservoir means adapted to hold air under pressure;
conduit means adapted to convey pressurized air from the air reservoir means to the air spring; and
valve means in said conduit means, said valve means being adapted to normally block said conduit and substantially relieve the pressure in the air spring and being actuatable by said control means to open said conduit and permit air pressure to be appplied to the air spring from the air reservoir means whenever the control means is actuated.

12. Load transfer means as claimed in claim 11 wherein:

the control means is adapted to actuate the air pressure means when the rate of wheel deceleration increases to about 14–19 feet per second per second;

the air pressure means, upon actuation, is adapted to inflate the air spring to a pressure of about 50–80 psi; and the valve means, upon deactuation, is adapted to substantially relieve the air pressure in the air spring.

13. Load transfer means as claimed in claim 10 wherein the control means is an anti-wheel lock control means for controlling brake pressure in response to wheel deceleration.

14. Load transfer means as claimed in claim 10 wherein:

the vehicle includes anti-wheel lock control means for controlling brake pressure in response to wheel deceleration, with the anti-wheel lock control means comprising sensor means adapted to emit an electrical signal at a rate proportional to the rate of wheel rotation, a control means connected to the sensor means and adapted to compute the rate of wheel deceleration from said electrical signal and emit an electrical control signal when the rate of wheel deceleration increases to a selected level, and a brake response means operably connected to the control means and adapted to control brake response upon the receipt of an actuation signal from the control means;

the control means for the load transfer means is connected to the sensor means for the anti-wheel lock control means and is adapted to compute the rate of wheel deceleration and transmit an actuation signal to the air pressure means whenever the rate of wheel deceleration reaches a predetermined level; and both of said control means are separately adjustable to control the point at which an actuation signal is produced by each control means.

15. Load transfer means as claimed in claim 10 wherein the tandem axles are mounted to the vehicle by means of a leaf spring suspension system and the common pivot point is between the double axles.

16. Load transfer means as claimed in claim 15 wherein the leaf spring suspension system comprises a leaf spring mounted on each side of the vehicle by means of a trunion that is mounted transversely on the underside of the vehicle, said leaf springs being mounted on the trunion at the mid-points thereof, and said tandem axles being mounted at opposite ends of the leaf springs.

17. Load transfer means for use in a vehicle comprising tandem axles interdependently suspended from a common pivot point between the axles on each side of the vehicle; an air compressor; and brakes, said load transfer means including:

air spring means adapted to resiliently urge the top of the rearmost of the tandem axles downwardly when inflated;

air reservoir means adapted to maintain air under pressure, said air reservoir means having inlet means adapted to receive compressed air from the compressor and outlet means adapted to deliver compressed air to the air spring means;

conduit means adapted to convey pressurized air from the outlet of the air reservoir means to the air spring means;

valve means in said conduit means, said valve means having a closed position, wherein the valve means blocks the flow of air from said air reservoir means to said air spring means, and an open position, wherein the valve means permits air to flow from the air reservoir means to the air spring means, said valve means being normally closed; and control means responsive to the braking force exerted by the vehicle brakes and adapted to open the valve means when the braking force reaches a predetermined level.

18. Load transfer as claimed in claim 17 wherein the control means is adapted to measure the brake pressure being applied to the vehicle brakes and open said valve means when the brake pressure reaches a predetermined level.

19. Load transfer means as claimed in claim 18 wherein the valve means is a pressure-operated relay valve, and the control means is adapted to measure brake pressure and apply a control pressure signal to the relay valve corresponding to brake pressure.

20. Load transfer means as claimed in claim 19 wherein the control means is adapted to open the relay valve when the pressure on the brakes increases to about 60 psi.

21. Load transfer means as claimed in claim 17 wherein:

the valve means is a solenoid-operated shut-off valve, said valve being normally closed and being actuatable to its open position; and the control means are adapted to sense electronically the speed of rotation of the wheels and compute therefrom the rate of deceleration of the wheels, the control means being further adapted to actuate the solenoid operated shutoff valve when the rate of deceleration reaches a predetermined level.

22. Load transfer means as claimed in claim 21 wherein the valve means is adapted to at least partially release the air pressure from the air spring means when the valve means is in its closed position.

23. Load transfer means as claimed in claim 17 wherein the tandem axles are suspended from leaf springs longitudinally mounted on each side of the vehicle, each leaf spring being pivotably mounted to the vehicle at a common point between the axles.

24. A method for counteracting the effects of brake torque in a tandem axle suspension system in a vehicle, wherein the tandem axles are interdependently suspended from a common pivot point between the axles on each side of the vehicle and an air spring is mounted over the rearmost of the tandem axles, said method comprising the steps of:

measuring the braking force applied to the vehicle wheels;

injecting additional air in the air spring to reduce the effects of brake torque on the tandem axles whenever the braking force increases to a predetermined level; and releasing the additional air from the air spring whenever the braking force or vehicle speed drops to a second predetermined level.

25. A method as claimed in claim 24 wherein the braking force measured is the brake torque exerted on the wheels.

26. A method as claimed in claim 24 wherein the braking force measured is the rate of wheel deceleration of the vehicle.

27. A method as claimed in claim 24 wherein the braking force measured is the brake pressure on the brakes.

28. A method as claimed in claim 24 wherein the air spring is normally maintained in a nearly deflated condition and is inflated to 50–80 psi air pressure to counteract brake torque.

29. A method as claimed in claim 28 wherein the air spring is inflated to 60–65 psi air pressure to counteract brake torque.

30. A method as claimed in claim 28 wherein the air spring in inflated to counteract brake torque whenever the rate of wheel deceleration of the vehicle reaches about 14–19 feet per second per second.

31. A method as claimed in claim 30 wherein the pressure is released from the air spring when the vehicle speed drops to about 10 miles per hour.

32. A method as claimed in claim 28 wherein the air spring is inflated to counteract brake torque whenever the brake pressure on the brakes reaches about 60 psi.

* * * * *